(12) United States Patent
Zuo

(10) Patent No.: US 11,764,703 B1
(45) Date of Patent: Sep. 19, 2023

(54) POWER CONVERSION METHOD FOR ALTERNATING CURRENT DIRECT GRID-CONNECTED TYPE BATTERY ENERGY STORAGE SYSTEM

(71) Applicant: Foshan Hechu Energy Technology Co., Ltd., Foshan (CN)

(72) Inventor: Wenping Zuo, Foshan (CN)

(73) Assignee: FOSHAN HECHU ENERGY TECHNOLOGY CO., LTD., Foshan (CN)

( * ) Notice: Subject to any disclaimer, the term of this patent is extended or adjusted under 35 U.S.C. 154(b) by 0 days.

(21) Appl. No.: 18/144,763

(22) Filed: May 8, 2023

Related U.S. Application Data

(63) Continuation of application No. PCT/CN2023/087517, filed on Apr. 11, 2023.

(30) Foreign Application Priority Data

Aug. 22, 2022 (CN) .......................... 2022110027293

(51) Int. Cl.
*H02J 7/02* (2016.01)
*H02M 7/797* (2006.01)

(52) U.S. Cl.
CPC .............. *H02M 7/797* (2013.01); *H02J 7/02* (2013.01); *H02J 2207/20* (2020.01)

(58) Field of Classification Search
CPC ....................................................... H02J 7/02
USPC ............................................ 320/107; 363/34
See application file for complete search history.

(56) References Cited

FOREIGN PATENT DOCUMENTS

| CN | 113285620 A | * | 8/2021 | ................ | H02J 3/02 |
| CN | 113364311 A | * | 9/2021 | ................ | H02J 3/02 |

OTHER PUBLICATIONS

CNIPA, Notification of a First Office Action for CN202211002729.3, dated Sep. 29, 2022.
Foshan Hechu Energy Technology Co., Ltd. (Applicant), Reply to Notification of a First Office Action for CN202211002729.3, w/ (allowed) replacement claims, dated Sep. 30, 2022.
CNIPA, Notification to grant patent right for invention in CN202211002729.3, dated Oct. 11, 2022.

* cited by examiner

*Primary Examiner* — Edward Tso
*Assistant Examiner* — Ahmed H Omar
(74) *Attorney, Agent, or Firm* — Zhigang Ma

(57) ABSTRACT

A power conversion method for an AC direct grid-connected type battery energy storage system is provided. The AC direct grid-connected type battery energy storage system includes at least one energy storage module, each energy storage module includes A, B and C three phase units composed of upper bridge arms and/or lower bridge arms, each bridge arm includes series-connected full-controlled battery modules and an inductor connected in series. High-voltage terminals of all the upper bridge arms of the energy storage module are connected to form a positive DC bus, and low-voltage terminals of all the lower bridge arms of the energy storage module are connected to form a negative DC bus. A low-voltage terminal of the upper bridge arm and a high-voltage terminal of the lower bridge arm of each phase unit are connected to form an AC terminal of the phase unit to connect with an external AC system.

9 Claims, 11 Drawing Sheets

POWER CONVERSION METHOD FOR ALTERNATING CURRENT DIRECT GRID-CONNECTED TYPE BATTERY ENERGY STORAGE SYSTEM

TECHNICAL FIELD

The invention relates to the field of electric energy storage technologies, and particularly to a power conversion method for an alternating current (AC) direct grid-connected type battery energy storage system.

BACKGROUND

With the proposal of "3060" dual carbon goals in China, proportions of wind power generation and photovoltaic power generation in the electric power system will increase on a large scale. In order to resist intermittency and volatility caused by large-scale new energy generation, electric energy storage will become an indispensable part of the future electric power system.

An existing battery energy storage system (abbreviated as BESS) generally uses an assembly type technology, a plurality of battery cells are connected in series and in parallel to form a battery module, a plurality of the battery modules are connected in series to form a battery cluster, a plurality of the battery clusters are connected in parallel to form a battery stack, and positive and negative direct current (DC) buses of the battery stack are respectively connected with positive and negative DC buses of a power conversion system. An AC side of the power conversion system is connected with an external AC system to form a grid-connected battery energy storage system. The power conversion system usually uses a topology of two-level or three-level voltage source converter which is used to realize DC/AC power conversion between the battery stack and the external AC system, and meanwhile, it also needs to be equipped with an AC filter for reducing AC output harmonics of the power conversion system, thereby bringing high cost and high loss to the grid-connected battery energy storage system.

Therefore, how to realize AC/DC power conversion between a battery energy storage system and an AC system with low cost and low loss is an urgent technical problem to be solved.

SUMMARY

In view of drawbacks of the prior art, a purpose of the invention is to provide a power conversion method for an AC direct grid-connected type battery energy storage system, which can realize AC/DC power conversion between a battery energy storage system and an AC system with low cost and low loss To achieve the above purpose, an embodiment of the invention provides a power conversion method for an AC direct grid-connected type battery energy storage system. The AC direct grid-connected type battery energy storage system includes at least one energy storage module, and each of the at least one energy storage module includes A, B, C three phase units each including an upper bridge arm and/or a lower bridge arm, each of the upper bridge arm and the lower bridge arm including series-connected full-controlled battery modules and an inductor connected in series.

When each of the A, B, C three phase units includes only the upper bridge arm, a low-voltage terminal of the upper bridge arm of each of the A, B, C three phase units forms an AC terminal of the phase unit, the AC terminals of the A, B, C three phase units are respectively connected to A, B, C three-phase terminals of an external AC system, and high-voltage terminals of the upper bridge arms of the A, B, C three phase units of the energy storage module are connected to form a positive direct current (DC) bus (H+) of the energy storage module; when each of the three phase units includes only the lower bridge arm, a high-voltage terminal of the lower bridge arm of each of the A, B, C three phase units forms the AC terminal of the phase unit, the AC terminals of the A, B, C three phase units are respectively connected to the A, B, C three-phase terminals of the external AC system, and low-voltage terminals of the lower bridge arms of the A, B, C three phase units of the energy storage module are connected to form a negative DC bus (L−) of the energy storage module; wherein when each of the A, B, C three phase units includes both the upper bridge arm and the lower bridge arm, the high-voltage terminals of the upper bridge arms of the energy storage module are connected to form the positive DC bus of the energy storage module, the low-voltage terminals of the lower bridge arms of the energy storage module are connected to form the negative DC bus of the energy storage module, the low-voltage terminal of the upper bridge arm and the high-voltage terminal of the lower bridge arm of each of the A, B, C three phase units are connected to form the AC terminal of the phase unit, and the AC terminals of the A, B, C three phase units are respectively connected to the A, B, C three-phase terminals of the external AC system.

Each of the full-controlled battery modules includes a full current-controlled battery circuit and a battery module, the full current-controlled battery circuit includes an energy transmission control unit and an intermediate energy unit, the intermediate energy unit includes an energy storage capacitor, the energy storage capacitor is connected with the battery module in parallel, and the energy transmission control unit includes first full-controlled power electronic devices configured to realize conduction or non-conduction of the energy storage capacitor with the external AC system.

wherein the power conversion method includes the following steps:

(1), acquiring voltages and currents on the A, B, C three-phase terminals of the external AC system, calculating an active power measured value $P_{acpu}$ and a reactive power measured value $Q_{acpu}$ of the AC direct grid-connected type battery energy storage system according to the voltages and the currents on the A, B, C three-phase terminals of the external AC system, and calculating an AC active current reference value $I_{dref}$ and an AC reactive current reference value $I_{qref}$ according to the active power measured value $P_{acpu}$, the reactive power measured value $Q_{acpu}$, an active power reference value $P_{acref}$ and a reactive power reference value $Q_{ref}$;

(2), performing closed-loop tracking control on the AC active current reference value $I_{dref}$ and the AC reactive current reference value $I_{qref}$ to obtain AC modulation ratios $m_a$, $m_b$, $m_c$, and calculating reference voltages of the upper bridge arms and/or the lower bridge arms of the A, B, C three phase units according to the AC modulation ratios $m_a$, $m_b$, $m_c$ as per formulas as follows:

$$V_{ref\_Ap}=V_{dcn}/2-m_a \times V_{dcn}/2,$$

$$V_{ref\_An}=V_{dcn}/2+m_a \times V_{dcn}/2,$$

$$V_{ref\_Bp}=V_{dcn}/2-m_b \times V_{dcn}/2,$$

$$V_{ref\_Bn}=V_{dcn}/2+m_b\times V_{dcn}/2,$$

$$V_{ref\_Cp}=V_{dcn}/2-m_c\times V_{dcn}/2,$$

$$V_{ref\_Cn}=V_{dcn}/2+m_c\times V_{dcn}/2,$$

where, $V_{ref\_Ap}$ represents the reference voltage of the upper bridge arm of the A phase unit, $V_{ref\_An}$ represents the reference voltage of the lower bridge arm of the A phase unit, $V_{ref\_Bp}$ represents the reference voltage of the upper bridge arm of the B phase unit, $V_{ref\_Bn}$ represents the reference voltage of the lower bridge arm of the B phase unit, $V_{ref\_Cp}$ represents the reference voltage of the upper bridge arm of the C phase unit, $V_{ref\_Cn}$ represents the reference voltage of the lower bridge arm of the C phase unit, and $V_{dcn}$ represents a DC rated voltage of the positive DC bus to the negative DC bus; and (3), calculating numbers of full current-controlled battery circuit required to be put in operation of the upper bridge arms and/or the lower bridge arms of the A, B, C three phase units according to the reference voltages of the upper bridge arms and/or the lower bridge arms of the A, B, C three phase units, and controlling the first full-controlled power electronic devices of the full current-controlled battery circuits of the upper bridge arms and/or the lower bridge arms of the A, B, C three phase units correspondingly according to the numbers of full current-controlled battery circuit required to be put in operation of the upper bridge arms and/or the lower bridge arms of the A, B, C three phase units to make differences of output voltages of the upper bridge arms and/or the lower bridge arms of the A, B, C three phase units with respect to the respective reference voltages of the upper bridge arms and/or the lower bridge arms of the A, B, C three phase units be within a set range, thereby realizing power conversion between the AC direct grid-connected type battery energy storage system and the external AC system.

The power conversion method for an AC direct grid-connected type battery energy storage system according to the above embodiment of the invention, by adding the full current-controlled battery circuit into each battery module to carry out a corresponding control thereto, can realize the AC/DC power conversion between the battery energy storage system and the AC system; and compared with the traditional grid-connected battery energy storage system, it can eliminate the power conversion system and thus greatly reduce the system cost, and meanwhile, due to the elimination of the power conversion system, corresponding loss of the power conversion system is eliminated, resulting in loss of the AC direct grid-connected type battery energy storage system is lower.

In some embodiments, in the step (3), formulas of calculating numbers of full current-controlled battery circuits required to be put in operation of the upper bridge arms and/or the lower bridge arms of the A, B, C three phase units are as follows:

$$N_{Ap}=\text{ROUND}(V_{ref\_Ap}/V_{cn}),$$

$$N_{An}=\text{ROUND}(V_{ref\_An}/V_{cn}),$$

$$N_{Bp}=\text{ROUND}(V_{ref\_Bp}/V_{cn}),$$

$$N_{Bn}=\text{ROUND}(V_{ref\_Bn}/V_{cn}),$$

$$N_{Cp}=\text{ROUND}(V_{ref\_Cp}/V_{cn}),$$

$$N_{Cn}=\text{ROUND}(V_{ref\_Cn}/V_{cn}),$$

where, $N_{Ap}$ represents the number of full current-controlled battery circuit required to be put in operation of the upper bridge arm of the A phase unit, $N_{An}$ represents the number of full current-controlled battery circuit required to be put in operation of the lower bridge arm of the A phase unit, $N_{Bp}$ represents the number of full current-controlled battery circuit required to be put in operation of the upper bridge arm of the B phase unit, $N_{Bn}$ represents the number of full current-controlled battery circuit required to be put in operation of the lower bridge arm of the B phase unit, $N_{Cp}$ represents the number of full current-controlled battery circuit required to be put in operation of the upper bridge arm of the C phase unit, $N_{Cn}$ represents the number of full current-controlled battery circuit required to be put in operation of the lower bridge arm of the C phase unit, ROUND represents a round-up function, and $V_{cn}$ represents a rated voltage of the energy storage capacitor.

In some embodiments, in the step (1), the calculating an AC active current reference value $I_{dref}$ and an AC reactive current reference value $I_{qref}$ specifically includes:

comparing the active power measured value $P_{acpu}$ with the active power reference value $P_{acref}$ by a difference operation and then performing a proportional-integral adjustment to obtain the AC active current reference value $I_{dref}$; and comparing the reactive power measured value $Q_{acpu}$ with the reactive power reference value $Q_{ref}$ and then performing a proportional-integral adjustment to obtain the AC reactive current reference value $I_{qref}$.

In some embodiments, the full current-controlled battery circuit further includes a current control unit, the current control unit includes a three-phase full-bridge circuit including six second full-controlled power electronic devices, two input terminals of the three-phase full-bridge circuit of the full current-controlled battery circuit are correspondingly connected to two terminals of the energy storage capacitor of the full current-controlled battery circuit, and AC output terminals of the three-phase full-bridge circuit of the full current-controlled battery circuit are connected to the battery module through inductors, respectively;

the power conversion method further includes:

acquiring voltages on the energy storage capacitors and currents $I_{dis}$ of the inductors of the all full current-controlled battery circuits of the upper bridge arms and/or the lower bridge arms of the A, B, C three phase units;

averaging the voltages on the energy storage capacitors of the all full current-controlled battery circuits of the upper bridge arms and/or the lower bridge arms of the A, B, C three phase units and then comparing with an average capacitor voltage reference value $V_{Cref}$ of the energy storage capacitors of the all full current-controlled battery circuits by a difference operation to obtain a difference value, and performing a proportional-integral adjustment on the difference value to obtain discharge current orders $I_{ord}$ of the battery modules corresponding to the all full current-controlled battery circuits; and comparing the discharge current orders $I_{ord}$ of the battery modules respectively with the currents $I_{dis}$ of the inductors of the all full current-controlled battery circuits corresponding to the battery modules by difference operations and then performing closed-loop control through a proportional-integral controller or a current hysteresis loop controller to obtain duty cycle signals for the six second full-controlled power electronic devices of each of the all full current-controlled battery circuits, and controlling ON-OFF states of the six second full-controlled power electronic devices of each of the all full current-controlled battery circuits by the duty cycle signals to perform closed-loop control on the currents $I_{dis}$ of the inductors of the all full current-controlled battery circuits and thereby ensure a balance between an active power output from the AC direct grid-connected type battery energy storage system to the external AC system and a discharge power of full current-controlled battery circuit.

In some embodiments, the AC terminals of the A, B, C three phase units of the energy storage module are respectively connected to the A, B, C three-phase terminals of the external AC system through an AC transformer.

In some embodiments, each of the A, B, C three phase units is composed of three bridge arms, and a combination form of the three bridge arms is a combination of three the upper bridge arm or a combination of three the lower bridge arm.

In some embodiments, the AC direct grid-connected type battery energy storage system further includes a redundant phase unit, an AC terminal of the redundant phase unit is connected to first terminals of three single-phase AC circuit breakers, second terminals of the three single-phase AC circuit breakers are respectively connected to the A, B, C three-phase terminals of the external AC system, and the AC terminals of the A, B, C three phase units of the energy storage module are respectively connected to the A, B, C three-phase terminals of the external AC system through an AC circuit breaker.

In some embodiments, each of the first full-controlled power electronic devices and the second full-controlled power electronic devices uses one or more transistors and an anti-parallel diode connected thereto, and the battery module uses 12~24 battery cells connected in series.

In some embodiments, the first full-controlled power electronic devices of the energy transmission control unit of the full current-controlled battery circuit are two first full-controlled power electronic devices respectively being a full-controlled power electronic device Q1 and a full-controlled power electronic device Q2, a low-voltage terminal of the full-controlled power electronic device Q1 is connected with a high-voltage terminal of the full-controlled power electronic device Q2, a high-voltage terminal of the full-controlled power electronic device Q1 is connected to a terminal of the energy storage capacitor, and a low-voltage terminal of the full-controlled power electronic device Q2 is connected to another terminal of the energy storage capacitor.

DETAILED DESCRIPTION OF EMBODIMENTS

To facilitate understanding of the invention, the invention will be described more fully with reference to the accompanying drawings. Preferred embodiments of the invention are shown in the accompanying drawings. However, this invention may be embodied in many different forms and is not limited to the embodiments described in the specification. Rather, these described embodiments are provided so that disclosed contents of the invention will be more thorough and comprehensive.

Unless otherwise stated, all technical and scientific terms used herein have same meanings as commonly understood by those skilled in the art to which the invention belongs. The terms used herein in the description of the invention are for the purpose of describing specific embodiments only and are not intended to limit the invention. The term "and/or" as used herein includes combinations of any and all of one or more of associated listed items.

In addition, terms "first" and "second" are used for descriptive purposes only and are not to be construed as indicating or implying relative importance or as implying the number of technical features indicated. Thus, features defined with "first" and "second" may explicitly or implicitly include at least one of the features. In the description of the invention, "a plurality of" means at least two, such as two, three, etc., unless specifically defined otherwise.

In order to realize AC/DC power conversion between a battery energy storage system and an AC system with lower cost and lower loss, embodiments of the invention eliminate a centralized power conversion system used for connecting the battery energy storage system with the AC system in a traditional grid-connected battery energy storage system, provide an AC direct grid-connected type battery energy storage system, and the AC/DC power conversion between the AC direct grid-connected type battery energy storage system and an AC system is realized through a corresponding power conversion algorithm.

Figure 1:
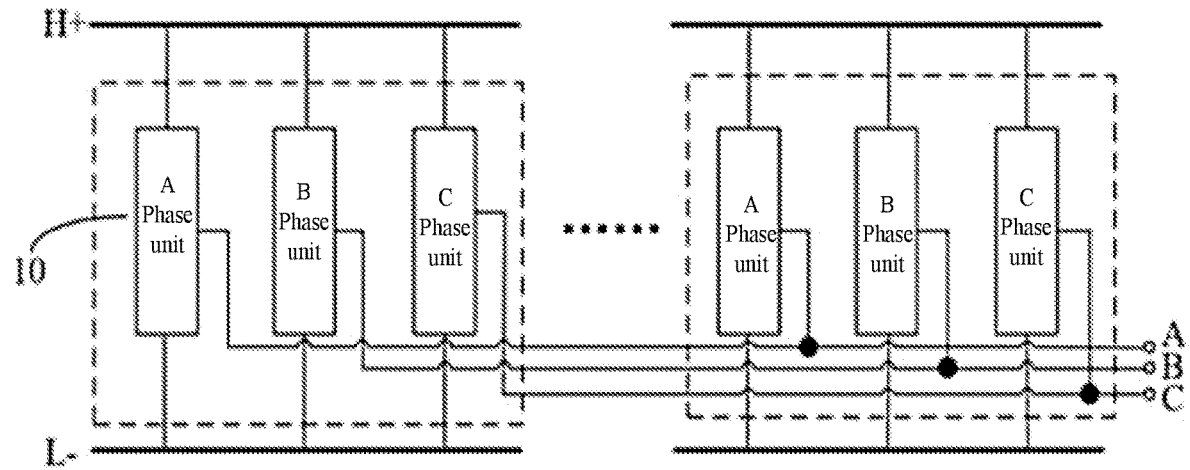
FIG. 1 illustrates a schematic block diagram of an AC direct grid-connected type battery energy storage system according to an embodiment of the invention.
Figure 2:
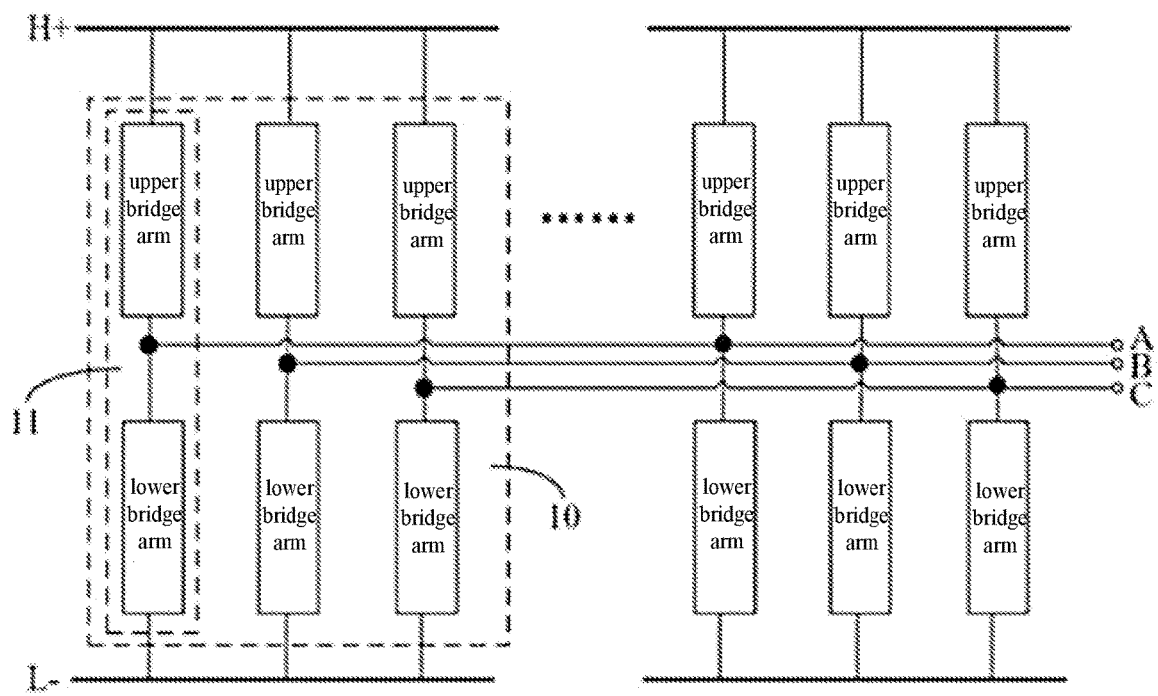
FIG. 2 illustrates a schematic block diagram of an AC direct grid-connected type battery energy storage system according to another embodiment of the invention.

FIG. 1 illustrates a schematic block diagram of an AC direct grid-connected type battery energy storage system according to an embodiment of the invention. As illustrated in FIG. 1, the battery energy storage system includes at least one energy storage module 10. Each the energy storage module 10 includes A, B, C three phase units each including an upper bridge arm and/or a lower bridge arm. In other words, each phase unit 11 may have a topology including only the upper bridge arm or only the lower bridge arm, or have a topology including both the upper bridge arm and the lower bridge arm, as shown in FIG. 2.

When each the phase unit 11 uses the topology including only the upper bridge arm, a low-voltage terminal of the upper bridge arm of the phase unit forms an AC terminal of the phase unit, the AC terminals of the A, B, C three phase units are respectively connected to A, B, C three-phase terminals of an external AC system, and high-voltage terminals of the upper bridge arms of the three phase units of each energy storage module are connected to form a positive DC bus H+ of the energy storage module. When each the phase unit uses the topology including only the lower bridge arm, a high-voltage terminal of the lower bridge arm of the phase unit forms the AC terminal of the phase unit, the AC terminals of the A, B, C three phase units are respectively connected to the A, B, C three-phase terminals of the external AC system, and low-voltage terminals of the low bridge arms of the three phase units of each energy storage module are connected to form a negative DC bus L− of the energy storage module. When each the phase unit 11 uses the topology including both the upper bridge arm and the lower bridge arm, as illustrated in FIG. 2, the low-voltage terminal of the upper bridge arm and the high-voltage terminal of the lower bridge arm of each of the A, B, C three phase units are connected to form the AC terminal of the phase unit, the AC terminals of the three phase units are respectively connected with the A, B, C three-phase terminals of the external AC system, the high-voltage terminals of the upper bridge arms of the three phase units of each energy storage module 10 are connected to form the positive DC bus H+ of the energy storage module, and the low-voltage terminals of the lower bridge arms of the three phase units of each energy storage module 10 are connected to form the negative DC bus L− of the energy storage module.

Figure 3:
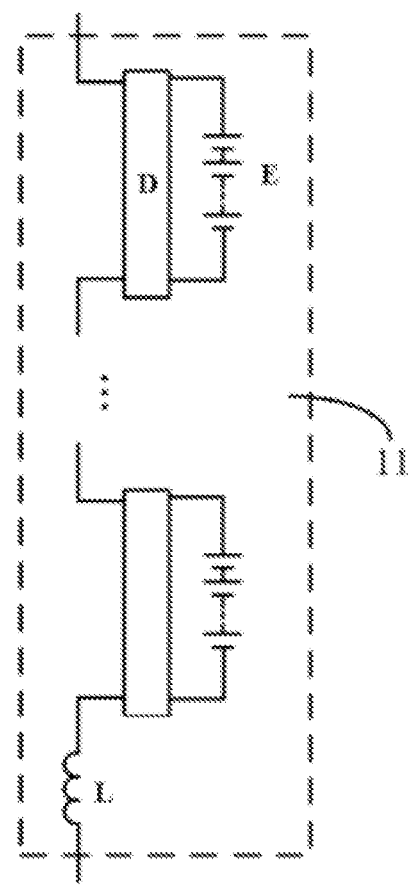
FIG. 3 illustrates a schematic circuit principle diagram of a bridge arm according to an embodiment of the invention.

As illustrated in FIG. 3, each bridge arm (i.e., the upper bridge arm or the lower bridge arm) in the illustrated embodiment includes a plurality of series-connected full-controlled battery modules and an inductor L connected with the plurality of series-connected full-controlled battery modules in series. The inductor L serves as a bridge of active power and reactive power conversions between the AC system and the energy storage system. Each the full-controlled battery module includes a full current-controlled battery circuit D and a battery module E.

Figure 4:
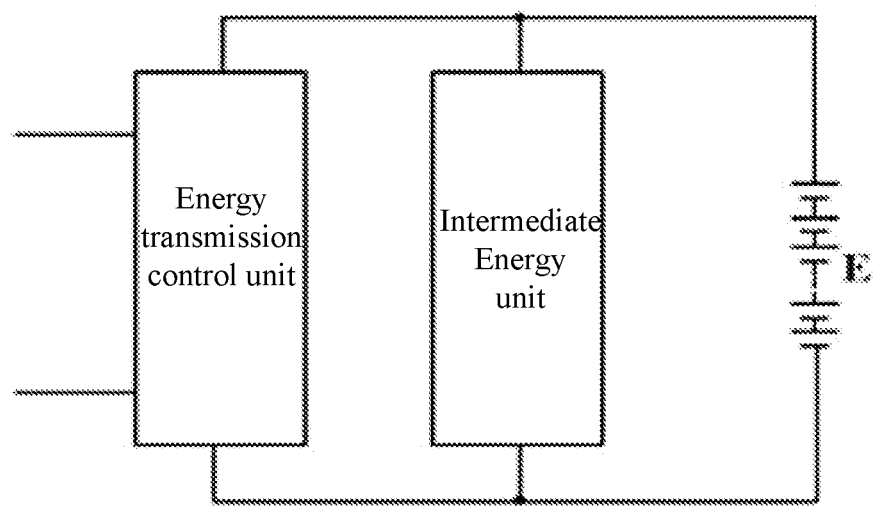
FIG. 4 illustrates a schematic block diagram of a full current-controlled battery circuit according to an embodiment of the invention.
Figure 16:
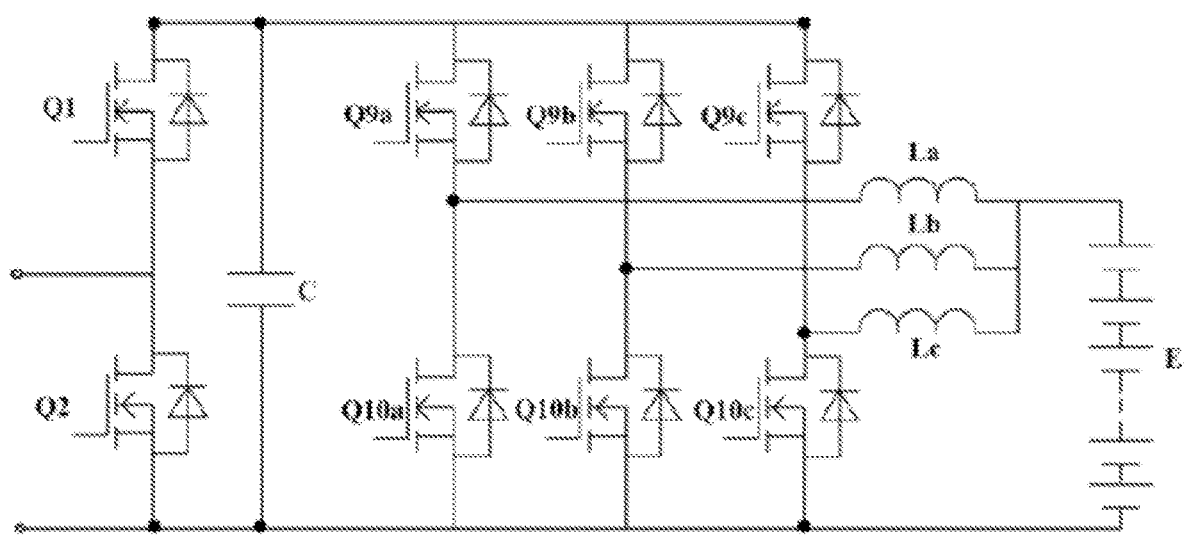
FIG. 16 illustrates a schematic topology of a full current-controlled battery circuit according to an embodiment of the invention.

As illustrated in FIG. 4, the full current-controlled battery circuit includes an energy transmission control unit and an intermediate energy unit. The intermediate energy unit uses an energy storage capacitor connected with the battery module E in parallel. The energy transmission control unit uses a plurality of first full-controlled power electronic devices, and a specific circuit form of the energy transmission control unit only needs to ensure that the energy storage capacitor is capable of being conducted or non-conducted with the external AC system. As illustrated in FIG. 16, the energy transmission control unit uses, for example, two full-controlled power electronic devices Q1 and Q2 connected in series. A common node of a low-voltage terminal of the full-controlled power electronic device Q1 with a high-voltage terminal of the full-controlled power electronic device Q2 serves as an input terminal of the energy transmission control unit, a high-voltage terminal of the full-controlled power electronic device Q1 or a low-voltage terminal of the full-controlled power electronic device Q2 serves as another input terminal of the energy transmission control unit, and the high-voltage terminal of the full-controlled power electronic device Q1 and the low-voltage terminal of the full-controlled power electronic device Q2 are respectively connected with two terminals of the energy storage capacitor C. In another embodiment, the energy transmission control unit may use four full-controlled power electronic devices instead, and a specific circuit thereof can be set by referring to the connection principle of two full-controlled power electronic devices connected in series, and thus will not be repeated herein.

Figure 5:
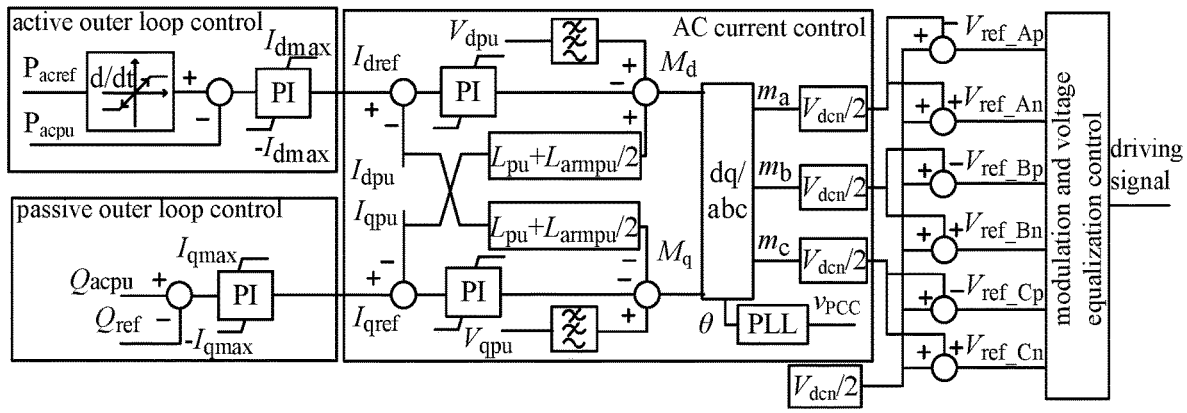
FIG. 5 illustrates a schematic control principle diagram of a power conversion method for an AC direct grid-connected type battery energy storage system according to an embodiment of the invention.

A power conversion method for the AC direct grid-connected type battery energy storage system according to an illustrated embodiment of the invention includes active outer loop control, reactive outer loop control, and AC current control; and as illustrated in FIG. 5, specifically includes steps S10-S30 described below in detail.

S10, acquiring voltages and currents on the A, B, C three-phase terminals of the external AC system, calculating an active power measured value $P_{acpu}$ and a reactive power measured value $Q_{acpu}$ of the AC direct grid-connected type battery energy storage system according to the voltages and the currents on the A, B, C three-phase terminals of the external AC system, and calculating an AC active current reference value $I_{dref}$ and an AC reactive current reference value $I_{qref}$ according to the active power measured value $P_{acpu}$, the reactive power measured value $Q_{acpu}$, an active power reference value $P_{acref}$ and a reactive power reference value $Q_{ref}$.

In the step S10, the calculating an AC active current reference value $I_{dref}$ and an AC reactive current reference value $I_{qref}$ may include: comparing the active power measured value $P_{acpu}$ with the active power reference value $P_{acref}$ by a difference operation, and then performing a proportional-integral adjustment through a proportional-integral controller PI to obtain the AC active current reference value $I_{dref}$, namely, a d-axis current reference value; and comparing the reactive power measured value $Q_{acpu}$ with the reactive power reference value $Q_{ref}$ by a difference operation, and then performing a proportional-integral adjustment through a proportional-integral controller PI to obtain the AC reactive current reference value $I_{qref}$, namely, a q-axis current reference value.

In an illustrated embodiment, the AC active current reference value $I_{dref}$ and the AC reactive current reference value $I_{qref}$ are obtained by closed-loop control of the active power measured value $P_{acpu}$ and the reactive power measured value $Q_{acpu}$, an active power and a reactive power can be accurately controlled, so that the AC direct grid-connected type battery energy storage system can accurately respond to active power and reactive power commands/orders of a power grid to the energy storage system.

S20, performing closed-loop tracking control on the AC active current reference value $I_{dref}$ and the AC reactive current reference value $I_{qref}$ to obtain AC modulation ratios $m_a$, $m_b$, $m_c$ at A, B, C coordinates; and calculating reference voltages of the upper bridge arms and/or the lower bridge arms of the A, B, C three phase units according to the AC modulation ratios $m_a$, $m_b$, $m_c$.

In an illustrated embodiment, the closed-loop tracking control specifically is as follows. The d-axis current reference value $I_{dref}$ is subtracted with a per-unit value $I_{dpu}$ of a d-axis current measured value to obtain a difference value, the difference value passes through a proportional-integral controller PI and then is output to obtain a d-axis current control fine adjustment quantity, the d-axis current control fine adjustment quantity is output and taken as negative and then is superposed with a per-unit value $V_{dpu}$ of a d-axis voltage measured value and a per-unit value $I_{qpu}$ of a q-axis current measured value*$(L_{pu}+L_{armpu}/2)$ to obtain a d-axis modulation ratio $M_d$. Likewise, the q-axis current reference value $I_{qref}$ is subtracted with the per-unit value $I_{qpu}$ of the q-axis current measured value to obtain a difference value, the difference value passes through a proportional-integral controller PI and then is output to obtain a q-axis current control fine adjustment quantity, the q-axis current control fine adjustment quantity is output and taken as negative and then is superposed with a per-unit value $V_{qpu}$ of a q-axis voltage measured value and $-I_{qpu}*(L_{pu}+L_{armpu}/2)$ to obtain a q-axis modulation ratio $M_q$. Afterwards, the d-axis modulation ratio $M_d$ and the q-axis modulation ratio $M_q$ are performed with dq/abc (i.e., dq to abc) conversion to obtain the AC modulation ratios $m_a$, $m_b$, $m_c$ at the A, B, C coordinates.

$L_{pu}$ represents a per-unit value of an AC output inductance of the AC direct grid-connected type battery energy storage system, and $L_{armpu}$ represents a per-unit value of a bridge arm inductance; the per-unit value $I_{dpu}$ of the d-axis current measured value and the per-unit value $I_{qpu}$ of the q-axis current measured value are obtained by currents on the A, B, C three-phase terminals being performed with a abc/dq (i.e., abc to dq) conversion and then divided by current reference values on the A, B, C three-phase terminals; and the per-unit value $V_{dpu}$ of the d-axis voltage measured value and the per-unit value $V_{qpu}$ of the q-axis voltage measured value are obtained by voltages on the A, B, C three-phase terminals being performed with the abc/dq conversion and then divided by voltage reference values of the A, B, C three-phase terminals.

In the step S20, formulas for calculating reference voltages of the upper bridge arms and/or the lower bridge arms of the A, B, C three phase units are as follows:

$$V_{ref\_Ap}=V_{dcn}/2-m_a\times V_{dcn}/2,$$

$$V_{ref\_An}=V_{dcn}/2+m_a\times V_{dcn}/2,$$

$$V_{ref\_Bp}=V_{dcn}/2-m_b\times V_{dcn}/2,$$

$$V_{ref\_Bn}=V_{dcn}/2+m_b\times V_{dcn}/2,$$

$$V_{ref\_Cp}=V_{dcn}/2-m_c\times V_{dcn}/2,$$

$$V_{ref\_Cn}=V_{dcn}/2+m_c\times V_{dcn}/2,$$

where, $V_{ref\_Ap}$ represents the reference voltage of the upper bridge arm of the A phase unit, $V_{ref\_An}$ represents the reference voltage of the lower bridge arm of the A phase unit; $V_{ref\_Bp}$ represents the reference voltage of the upper bridge arm of the B phase unit, $V_{ref\_Bn}$ represents the reference voltage of the lower bridge arm of the B phase unit; $V_{ref\_Cp}$ represents the reference voltage of the upper bridge arm of the C phase unit, $V_{ref\_Cn}$ represents the reference voltage of the lower bridge arm of the C phase unit; and $V_{dcn}$ represents a DC rated voltage of the positive DC bus to the negative DC bus.

According to the above formulas for calculating reference voltages of the upper bridge arms and/or the lower bridge arms of the A, B, C three phase units, it can be found that:

$$m_a\times V_{dcn}/2=(V_{ref\_An}-V_{ref\_Ap})/2,$$

$$m_b\times V_{dcn}/2=(V_{ref\_Bn}-V_{ref\_Bp})/2,$$

$$m_c\times V_{dcn}/2=(V_{ref\_Cn}-V_{ref\_Cp})/2.$$

In an illustrated embodiment, a role of the reference voltages $V_{ref\_Ap}$~$V_{ref\_Cn}$ is that: through output voltages of the respective bridge arms approaching the reference voltages $V_{ref\_Ap}$~$V_{ref\_Cn}$, output voltages of the AC terminals of the A, B, C three phase units of the AC direct grid-connected type battery energy storage system approach output voltage reference values $m_a\times V_{dcn}/2$, $m_b\times V_{dcn}/2$, $m_c\times V_{dcn}/2$ of the respective AC terminals.

S30, calculating numbers of full current-controlled battery circuit required to be put in operation of the upper bridge arms and/or the lower bridge arms in the A, B, C three phase units according to the reference voltages of the upper bridge arms and/or the lower bridge arms of the A, B, C three phase units, and correspondingly controlling the first full-controlled power electronic devices of the full current-controlled battery circuits of the upper bridge arms and/or the lower bridge arms of the A, B, C three phase units according to the numbers of full current-controlled battery circuit required to be put in operation of the upper bridge arms and/or lower bridge arms of the A, B, C three phase units to make differences of output voltages of the upper bridge arms and/or the lower bridge arms of the A, B, C three phase units with respect to the respective reference voltages of the upper and/or lower bridge arms of the A, B, C three phase units be within a set range, namely, make the output voltages of the upper and/or lower bridge arms correspondingly approach their respective reference voltages, thereby realizing power conversion between the AC direct grid-connected type battery energy storage system and the external AC system.

In the step S30, formulas for calculating numbers of full current-controlled battery circuit required to be put in operation of the upper bridge arms and/or the lower bridge arms of the A, B, C three phase units are as follows:

$$N_{Ap}=\text{ROUND}(V_{ref\_Ap}/V_{cn}),$$

$$N_{An}=\text{ROUND}(V_{ref\_An}/V_{cn}),$$

$$N_{Bp}=\text{ROUND}(V_{ref\_Bp}/V_{cn}),$$

$$N_{Bn}=\text{ROUND}(V_{ref\_Bn}/V_{cn}),$$

$$N_{Cp}=\text{ROUND}(V_{ref\_Cp}/V_{cn}),$$

$$N_{Cn}=\text{ROUND}(V_{ref\_Cn}/V_{cn}),$$

where, $N_{Ap}$ represents the number of full current-controlled battery circuit required to be put in operation of the upper bridge arm of the A phase unit, $N_{An}$ represents the number of full current-controlled battery circuit required to be put in operation of the lower bridge arm of the A phase unit; $N_{Bp}$ represents the number of full current-controlled battery circuit required to be put in operation of the upper bridge arm of the B phase unit, $N_{Bn}$ represents the number of full current-controlled battery circuit required to be put in operation of the lower bridge arm of the B phase unit; $N_{Cp}$ represents the number of full current-controlled battery circuit required to be put in operation of the upper bridge arm of the C phase unit, $N_{Cn}$ represents the number of full current-controlled battery circuit required to be put in operation of the lower bridge arm of the C phase unit; ROUND represents a round-up function, and $V_{cn}$ represents a rated voltage value of the energy storage capacitor.

In summary, the power conversion method for an AC direct grid-connected type battery energy storage system according to the illustrated embodiment of the invention, by adding the full current-controlled battery circuit into each battery module to carry out a corresponding control thereto, can realize the AC-DC power conversion between the battery energy storage system and the AC system; and compared with the traditional grid-connected battery energy storage system, it can eliminate the power conversion system and thus greatly reduce the system cost, and meanwhile, due to the elimination of the power conversion system, corresponding loss of the power conversion system is eliminated, resulting in loss of the AC direct grid-connected type battery energy storage system is lower.

Figure 6:
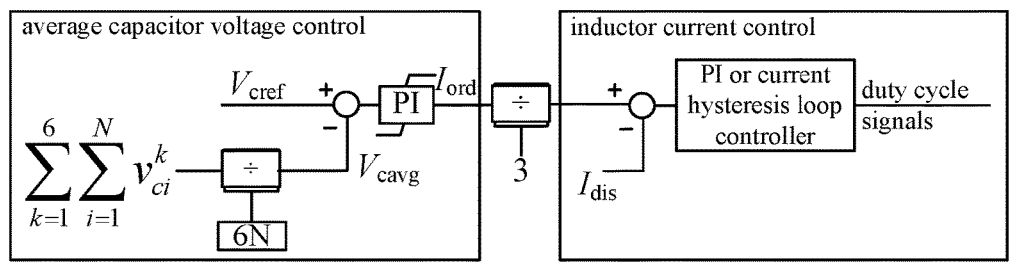
FIG. 6 illustrates a schematic control principle diagram of a power conversion method for an AC direct grid-connected type battery energy storage system according to another embodiment of the invention.

In an illustrated embodiment, in order to ensure a balance between an active power output from the energy storage system to the AC system and a discharge power of battery energy storage module, the full current-controlled battery circuit D according to some embodiments of the invention further includes a current control unit. As illustrated in FIG. 16, the current control unit uses a three-phase full-bridge circuit composed of six second full-controlled power electronic devices Q9a, Q9b, Q9c, Q10a, Q10b, Q10c. Two input terminals of the three-phase full-bridge circuit of the full current-controlled battery circuit are correspondingly connected with two terminals of the energy storage capacitor of the full current-controlled battery circuit, and AC output terminals of respective phases of the three-phase full-bridge circuit of the full current-controlled battery circuit are connected to the battery module E through respective inductors La, Lb, Lc. Correspondingly, the power conversion method according to some embodiments of the invention further is configured with average capacitor voltage control and inductor current control, as illustrated in FIG. 6, a detailed description will be given as follows.

Step 1, measuring and acquiring voltages $v_{ci}^k$ on the energy storage capacitors of all full current-controlled battery circuits of the upper and/or lower bridge arms of the A, B, C three phase units, and currents $I_{dis}$ of the inductors of the all full current-controlled battery circuits of the upper and/or lower bridge arms of the A, B, C three phase units.

In particular, when each the energy storage module includes A, B, C three phase units each being composed of the upper bridge arm and the lower bridge arm, a value range of k is 1~6, which corresponds to the A, B, C three phase units having six bridge arms in total. Similarly, when each the energy storage module includes three phase units A, B, C each being composed of the upper bridge arm or the lower bridge arm, the value range of k will not be described in detail herein. A value range of i is 1~N, N represents a total number of full current-controlled battery circuit of each of the bridge arms, for example, as to the upper bridge arm of the A phase unit, a relationship between N and $N_{Ap}$ is that $N \geq N_{Ap}$; as to the lower bridge arm of the A phase unit, a relationship between N and $N_{An}$ is that $N \geq N_{An}$; as to the upper bridge arm of the B phase unit, a relationship between N and $N_{Bp}$ is that $N \geq N_{Bp}$; as to the lower bridge arm of the B phase unit, a relationship between N and $N_{An}$ is that $N \geq N_{Bn}$; as to the upper bridge arm of the C phase unit, a relationship between N and $N_{Cp}$ is that $N \geq N_{Cp}$; as to the lower bridge arm of the C phase unit, a relationship between N and $N_{cn}$ is that $N \geq N_{Cn}$.

Step 2, averaging the voltages $v_{ci}^k$ on the energy storage capacitors of the all full current-controlled battery circuits of the bridge arms (e.g., the upper and lower bridge arms) of the A, B, C three phase units through dividing by (6*N) to obtain a voltage average value $V_{cavg}$ of the energy storage capacitors of the all full current-controlled battery circuits of the bridge arms, comparing the voltage average value $V_{cavg}$ with an average capacitor voltage reference value $V_{cref}$ of the energy storage capacitors of the all full current-controlled battery circuits by a difference operation and then passing through a proportional-integral controller PI to obtain discharge current orders $I_{ord}$ of the battery modules. Similarly, when each the energy storage module includes three phase units A, B, C each being composed of the upper bridge arm or the lower bridge arm, a control principle of acquiring discharge current orders of the battery modules is the like and thus will not be repeated herein.

Step 3, comparing the discharge current orders $I_{ord}$ of the battery modules respectively with the currents $I_{dis}$ of the inductors of the all full current-controlled battery circuits corresponding to the battery modules by difference operations and then subjecting to closed-loop control of a proportional-integral controller or a current hysteresis loop controller to obtain duty cycle signals for the six second full-controlled power electronic devices of each of the all full current-controlled battery circuits, and then correspondingly controlling ON-OFF states of the six second full-controlled power electronic devices of each of the all full current-controlled battery circuits (by the duty cycle signals) to perform closed-loop control on the currents of the inductors of the all full current-controlled battery circuits and thereby keep a balance between the active power output from the energy storage system to the external AC system and a discharge power of full current-controlled battery circuit.

In an illustrated embodiment, the voltage average value of the energy storage capacitors of all the full current-controlled battery circuits put in operation is used to represent the balance between the AC active power of the energy storage system and discharge energy of the battery modules of the energy storage system. When the discharge power of the battery energy storage system to the AC system increases, the voltage average value of the energy storage capacitors will decrease, the average capacitor voltage control provided by the illustrated embodiment of the invention can increase a value of the discharge current order $I_{ord}$ of the battery module to increase the discharge energy of the battery module, thereby supplementing the voltage decrease caused by the energy storage capacitor discharging to the AC system. When the discharge power of the battery energy storage system to the AC system decreases, the voltage average value of the energy storage capacitors will increase, the average capacitor voltage control provided by the illustrated embodiment of the invention can decrease the value of the discharge current order $I_{ord}$ of the battery module to decrease the discharge energy of the battery module, thereby absorbing the voltage increase caused by the energy storage capacitor decreasing the discharge to the AC system.

In an embodiment, the AC terminals of the A, B, C three phase units of each energy storage module 10 are respectively connected to the A, B, C three-phase terminals of the external AC system through an AC transformer, so that different voltage levels of the external AC system can be flexibly matched.

In an embodiment, each phase unit may be composed of three bridge arms, and a combination form of the three bridge arms is a combination of three upper bridge arms or a combination of three lower bridge arms. Compared with the structural form of each phase unit composed of two bridge arms, the number of energy storage modules corresponding to the energy storage system can be configured more conveniently.

In an embodiment, the AC direct grid-connected type battery energy storage system provided by the invention further includes a redundant phase unit. A topology of the redundant phase unit is the same as the topology of the phase unit of the energy storage module, an AC terminal of the redundant phase unit is connected to first terminals of three single-phase AC circuit breakers, second terminals of the three single-phase AC circuit breakers are correspondingly connected to the A, B, C three-phase terminals of the external AC system; and the AC terminals of the A, B, C three phase units of each the energy storage module are respectively connected to the A, B, C three-phase terminals of the external AC system through a AC circuit breaker.

In some embodiments, when any one of the A, B, C three phase units of the AC direct grid-connected type energy storage system fails, by switching on the single-phase AC circuit breaker of A, B or C phase, the redundant phase unit can be connected to the external AC system, thereby realizing redundant backup of phase unit of the energy storage system and avoiding the malfunction of the energy storage module caused by the failure of single phase unit.

The AC direct grid-connected type battery energy storage system according to some embodiments of the invention and its control strategy (power conversion method) will be described in the following with reference to specific embodiments.

Figure 7:
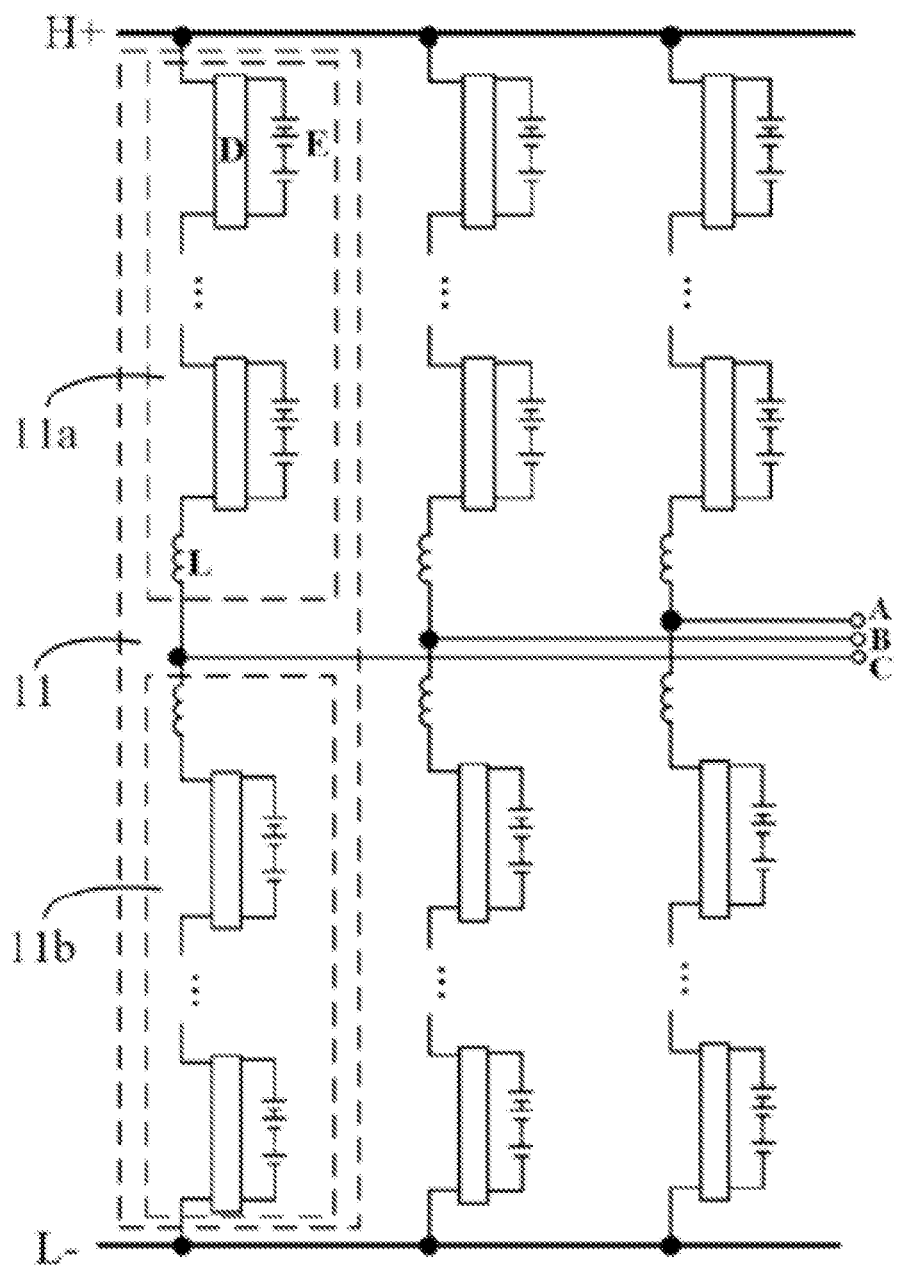
FIG. 7 illustrates a schematic topology of an AC direct grid-connected type battery energy storage system according to a first embodiment of the invention.

FIG. 7 illustrates a schematic circuit principle diagram of an AC direct grid-connected type battery energy storage system according to a specific embodiment of the invention. As illustrated in FIG. 7, the battery energy storage system includes one energy storage module. The energy storage module is composed of three phase units 11, and each of the three phase units 11 is composed of an upper bridge arm 11a and a lower bridge arm 11b connected in series. High-voltage terminals of the upper bridge arms 11a of the three phase units 11 are connected to form a positive DC bus H+ of the energy storage module 10, and low-voltage terminals of the lower bridge arms 11b of the three phase units 11 are connected to form a negative DC bus L− of the energy storage module 10. A common node of the upper bridge arm and the lower bridge arm of each of the three phase units 11 forms an AC output terminal of the phase unit, the AC output terminals of the three phase units are correspondingly connected to A, B, C three-phase terminals of an external AC system, each of the upper bridge arms and the lower bridge arms of the three phase units 11 is formed by connecting a plurality of full-controlled battery modules in series and then connecting with an inductor in series, and each of the plurality of full-controlled battery modules includes a full current-controlled battery circuit D and a battery module E.

In the embodiment associated with FIG. 7, each the phase unit 11 is composed of the upper bridge arm 11a and the lower bridge arm 11b connected in series, each the upper bridge arm 11a is composed of N number of full-controlled battery modules and the inductor L connected in series, each the full-controlled battery module includes one full current-controlled battery circuit D and one battery module E. A high-voltage terminal of the first full current-controlled battery circuit is the high-voltage terminal of the upper bridge arm 11a, a low-voltage terminal of the first full current-controlled battery circuit is connected with a high-voltage terminal of the second full current-controlled battery circuit, and so on, a low-voltage terminal of the (N−1)th full current-controlled battery circuit is connected to a high-voltage terminal of the Nth full current-controlled battery circuit, a low-voltage terminal of the Nth full current-controlled battery circuit is connected to one terminal of the inductor L of the upper bridge arm, and the other one terminal of the inductor L of the upper bridge arm is connected to one terminal of the inductor of the lower bridge arm 11b. The other one terminal of the inductor of the lower bridge arm is connected to a high-voltage terminal of the first full current-controlled battery circuit of the lower bridge arm, a low-voltage terminal of the first full current-control battery circuit of the lower bridge arm is connected to a high-voltage terminal of the second full current-controlled battery circuit of the lower bridge arm, and so on, a low-voltage terminal of the (N−1)th full current-controlled battery circuit of the lower bridge arm is connected to a high-voltage terminal of the Nth full current-controlled battery circuit of the lower bridge arm, and a low-voltage terminal of the Nth full current-controlled battery circuit of the lower bridge arm forms the low-voltage terminal of the lower bridge arm 11b.

Figure 8:
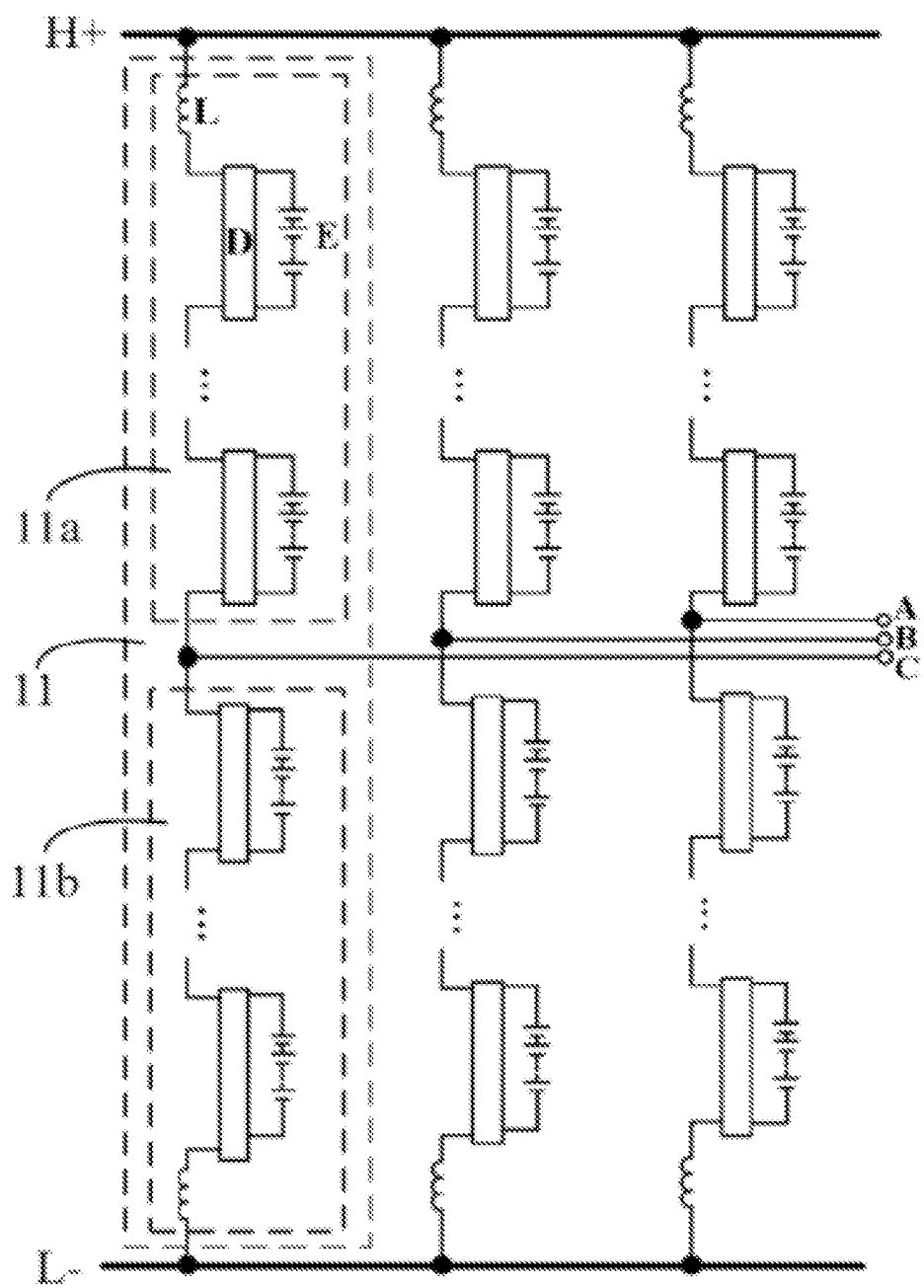
FIG. 8 illustrates a schematic topology of an AC direct grid-connected type battery energy storage system according to a second embodiment of the invention.

An embodiment associated with FIG. 8 is similar to the embodiment associated with FIG. 7, and has differences as that: the high-voltage terminal of the upper bridge arm 11a of each the phase unit 11 is one terminal of the inductor L of the upper bridge arm, the other one terminal of the inductor L of the upper bridge arm is connected to the high-voltage terminal of the first full current-control battery circuit of the upper bridge arm, the low-voltage terminal of the first full current-controlled battery circuit of the upper bridge arm is connected to the high-voltage terminal of the second full current-controlled battery circuit of the upper bridge arm, and so on, the low-voltage terminal of the (N−1)th full current-controlled battery circuit of the upper bridge arm is connected to the high-voltage terminal of the Nth full current-controlled battery circuit of the upper bridge arm, and the low-voltage terminal of the Nth full current-controlled battery circuit is connected to the high-voltage terminal of the first full current-control battery circuit of the lower bridge arm 11b. The low-voltage terminal of the first full current-controlled battery circuit of the lower bridge arm 11b is connected to the high-voltage terminal of the second full current-controlled battery circuit of the lower bridge arm, and so on, the low-voltage terminal of the (N−1)th full current-controlled battery circuit of the lower bridge arm 11b is connected to the high-voltage terminal of the Nth full current-controlled battery circuit of the lower bridge arm 11b, the low-voltage terminal of the Nth full current-controlled battery circuit of the lower bridge arm 11b is connected to one terminal of the inductor of the lower bridge arm, and the other one terminal of the inductor of the lower bridge arm forms the low-voltage terminal of the lower bridge arm 11b.

Figure 9:
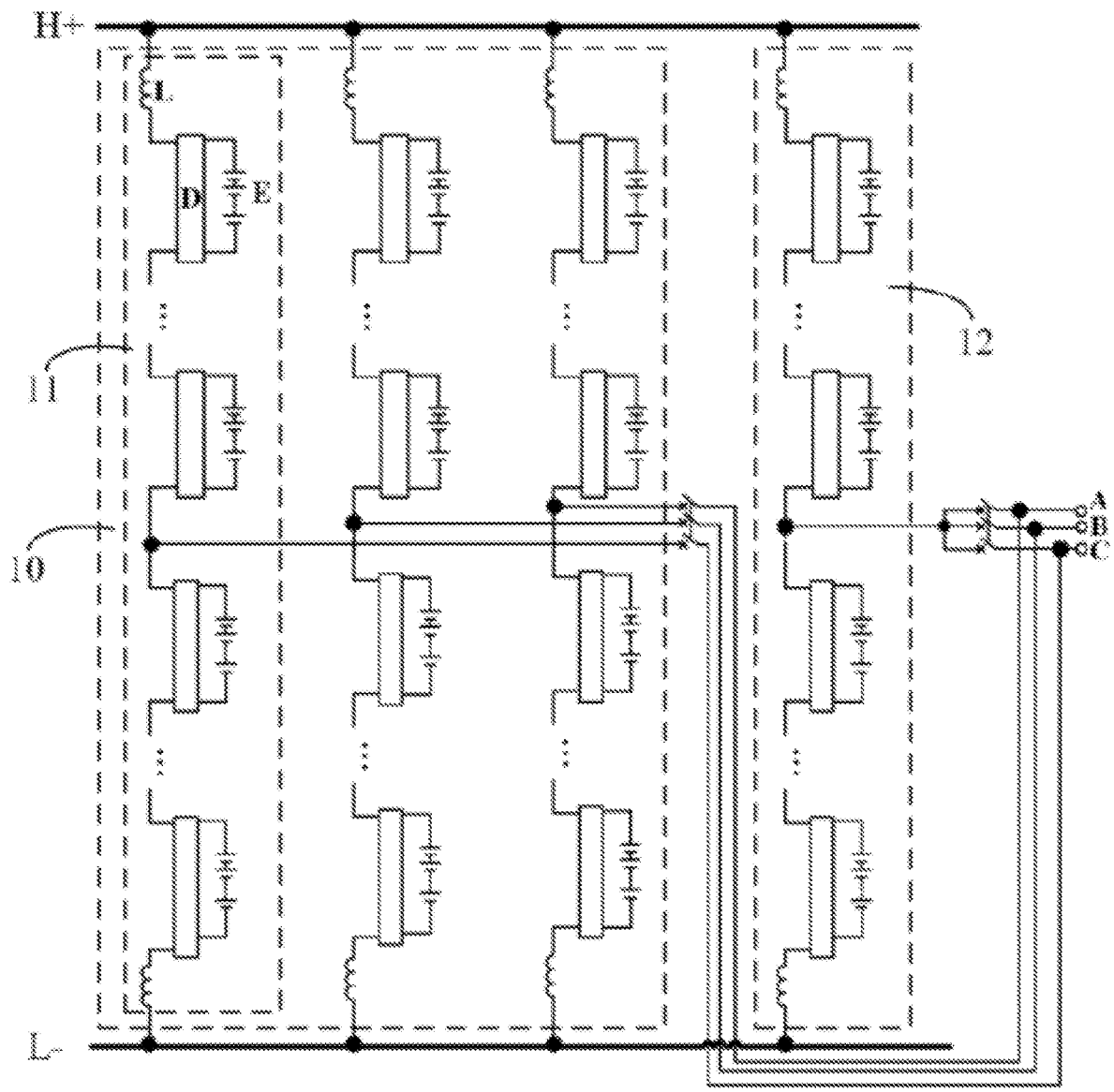
FIG. 9 illustrates a schematic topology of an AC direct grid-connected type battery energy storage system according to a third embodiment of the invention.

An embodiment associated with FIG. 9 is similar to the embodiment associated with FIG. 7, and has differences as that: the energy storage module 10 is connected to the A, B, C three-phase terminals of the external AC system through an AC circuit breaker, the energy storage system further is equipped with an additional phase unit, the additional phase unit is called as redundant phase unit 12, a high-voltage terminal of the redundant phase unit 12 is connected to the positive DC bus H+, a low-voltage terminal of the redundant phase unit 12 is connected to the negative DC bus L−, an AC output terminal of the redundant phase unit 12 is connected to first ends of three single-phase AC circuit breakers, and second terminals of the three single-phase AC circuit breakers are correspondingly connected to the A, B, C three-phase terminals of the external AC system.

When any one of the A, B, C three phase units of the AC direct grid-connected type energy storage system fails, e.g., when downlink communication failure, downlink communication failure, battery cell overtemperature in the battery module, and power electronic device overtemperature occur, the full current-controlled battery circuit is determined to be in a fault state, and when a number of the full current-controlled battery circuits in the fault state in one phase unit exceeds the number of redundant full current-controlled battery circuits, the phase unit is determined to be in a fault state, by switching on a corresponding single-phase AC circuit breaker of A, B or C phase, the redundant phase unit 12 can be connected to the external AC system, thereby realizing redundant backup of phase unit of the energy storage system and avoiding the malfunction of the energy storage module caused by the failure of single phase unit.

When the AC direct grid-connected type battery energy storage system according to the embodiment associated with FIG. 9 includes a plurality of energy storage modules 10, the redundant phase unit 12 of the illustrated embodiment can conveniently realize non-stop online operation and maintenance of each the energy storage module 10. When the upper bridge arm 11a or the lower bridge arm 11b of a certain energy storage module 10 fails, causing that one phase unit 11 of the energy storage modules 10 fails and cannot continue operating, the redundant phase unit 12 can be put in operation to replace the failed phase unit of the energy storage module 10, so that the energy storage module 10 with the failed phase unit can still maintain uninterrupted operation, and the failed phase unit can be performed with online repair and maintenance. A specific implementation may be that: locking the failed energy storage module 10 and then switching on the single-phase AC circuit breaker of the X phase (e.g., A phase) of the redundant phase unit 12, then using the redundant phase unit 12 and the non-faulty phase units of the failed energy storage module as a new energy storage module for overall control, and unlocking the new energy storage module.

Figure 10:
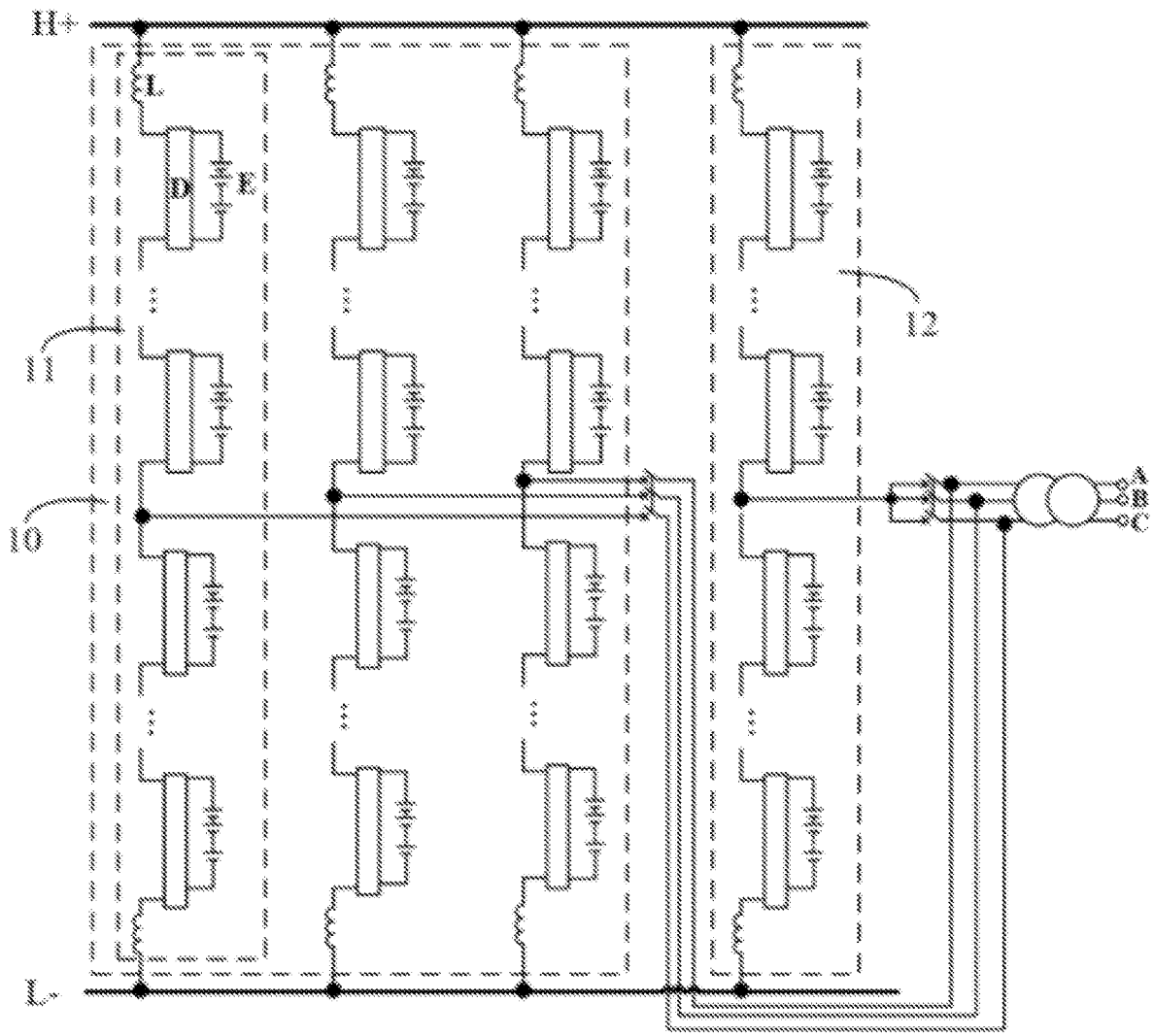
FIG. 10 illustrates a schematic topology of an AC direct grid-connected type battery energy storage system according to a fourth embodiment of the invention.

An embodiment associated with FIG. 10 is an improvement on the basis of the embodiment associated with FIG. 9. In particular, the AC output terminals of the A, B, C three phase units are connected to the external AC system through an AC transformer, so that different voltage levels of the external AC system can be flexibly matched.

In order to increase the energy of single AC direct grid-connected type energy storage system, the AC direct grid-connected type energy storage system may include two or more energy storage modules 10. Specifically, positive DC buses of the energy storage modules 10 are not connected to each other, and negative DC buses of the energy storage modules 10 also are not connected to each other, so as to avoid mutual coupling of the energy storage modules 10 on the DC side. In an embodiment associated with FIG. 11, the single AC direct grid-connected type energy storage system includes two energy storage modules 10 in total.

Figure 11:
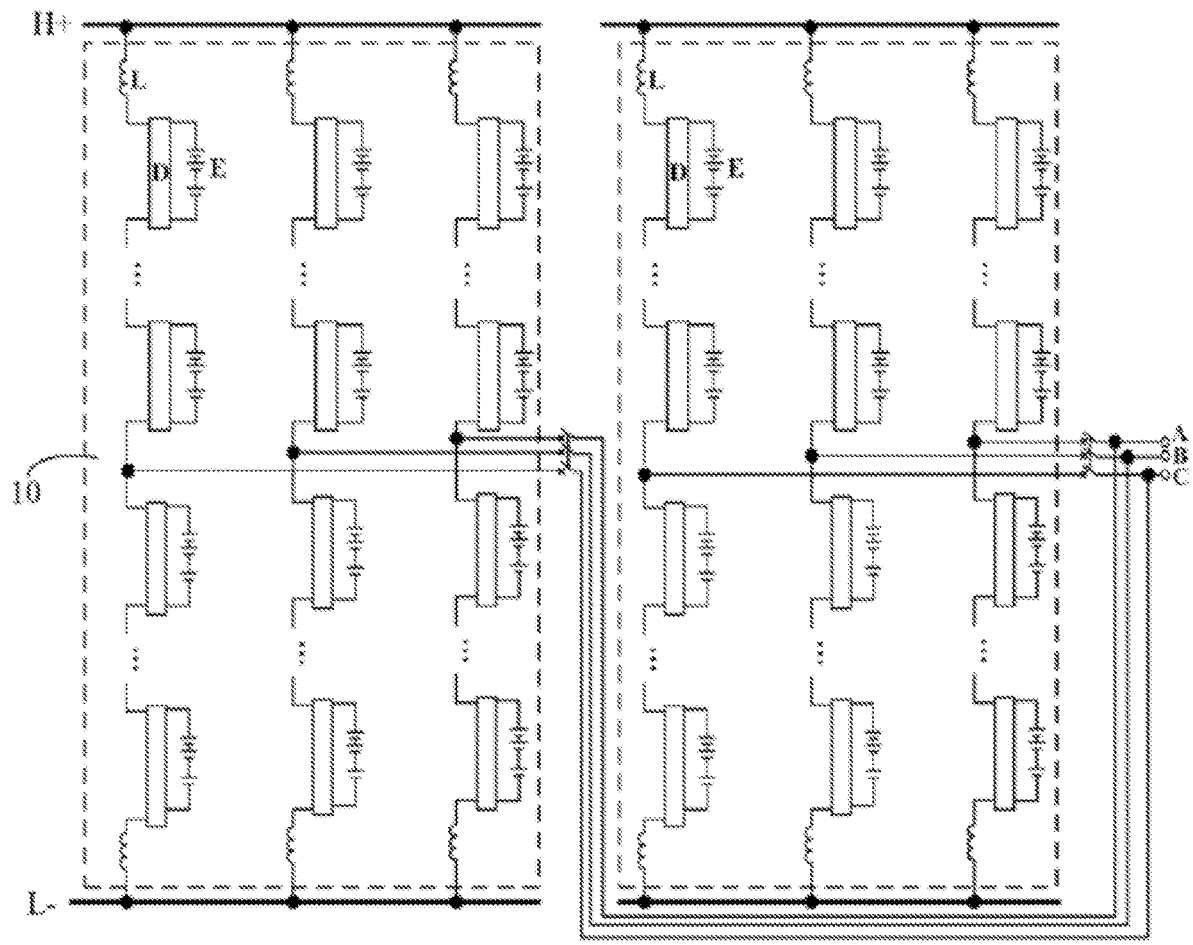
FIG. 11 illustrates a schematic topology of an AC direct grid-connected type battery energy storage system according to a fifth embodiment of the invention.
Figure 12:
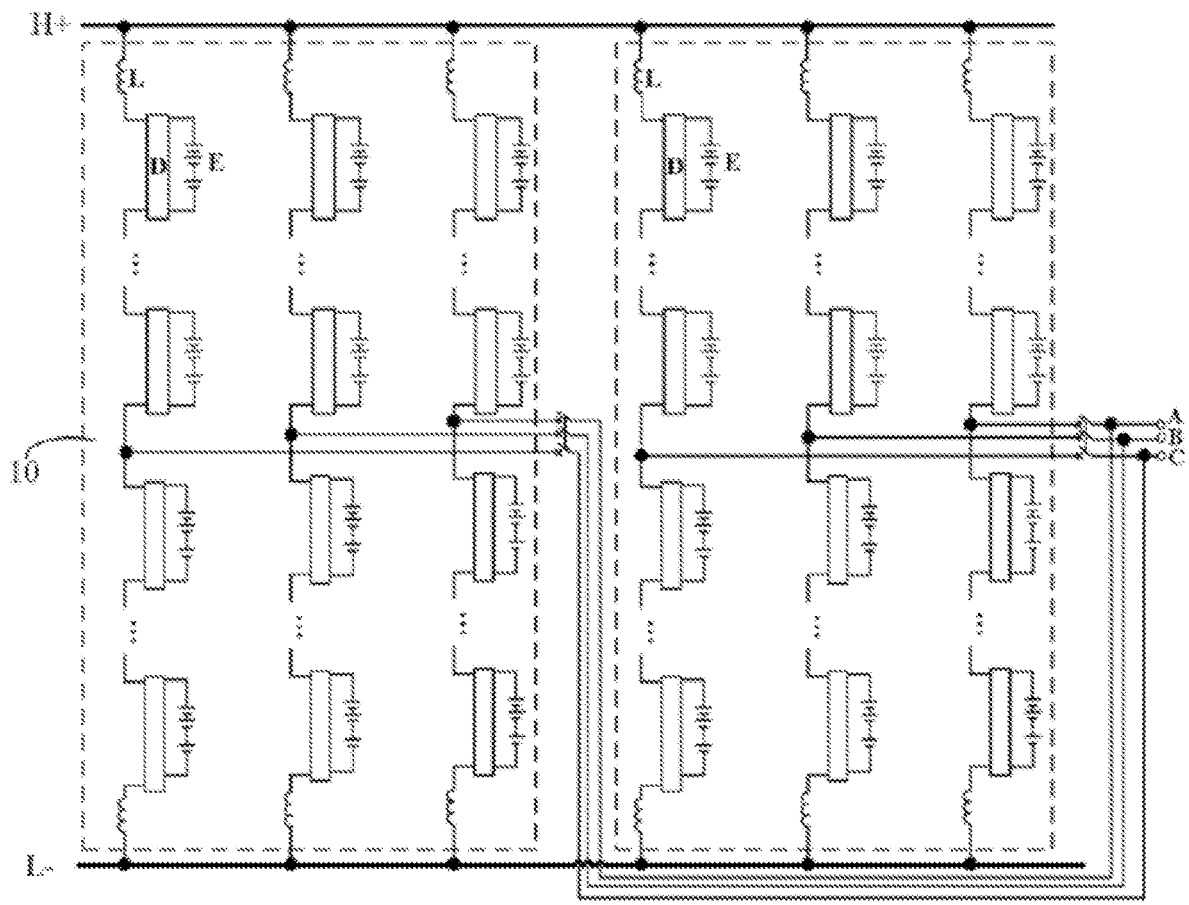
FIG. 12 illustrates a schematic topology of an AC direct grid-connected type battery energy storage system according to a sixth embodiment of the invention.

An embodiment associated with FIG. 12 is similar to the embodiment associated with FIG. 11, and has differences as that: in the illustrated embodiment associated with FIG. 12, the positive DC buses of the energy storage modules 10 are connected with each other, the negative DC buses of the energy storage modules 10 are also connected with each other, and the positive DC buses and the negative DC buses of energy storage modules 10 can be further externally connected with the external DC system.

Figure 13:
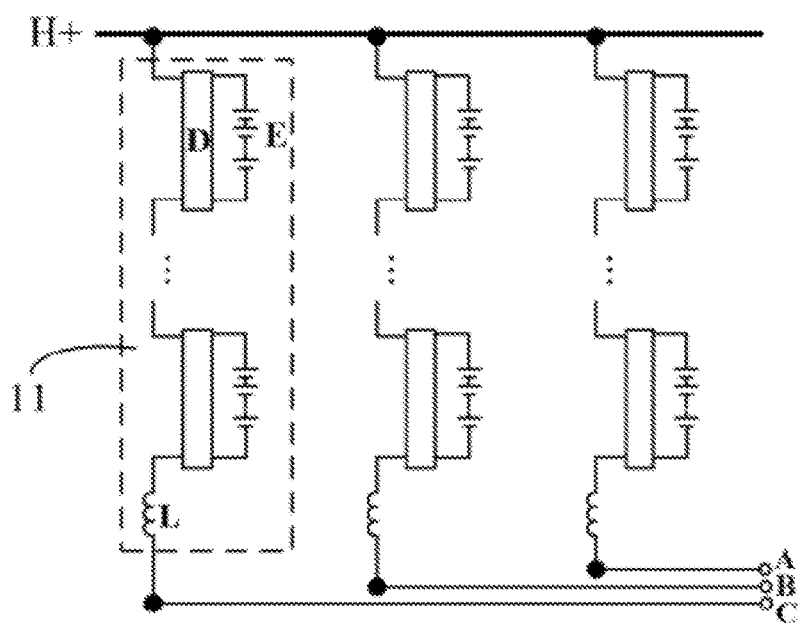
FIG. 13 illustrates a schematic topology of an AC direct grid-connected type battery energy storage system according to a seventh embodiment of the invention.

In an embodiment associated with FIG. 13, each energy storage module is composed of three phase units, each of the three phase units 11 is composed of one upper bridge arm, and the upper bridge arm is composed of N number of full-controlled battery modules and one inductor L connected in series. Each of the N number of full-controlled battery modules includes one full current-controlled battery circuit D and one battery module E. A high-voltage terminal of the first full current-controlled battery circuit is the high-voltage terminal of the upper bridge arm, a low-voltage terminal of the first full current-controlled battery circuit is connected to a high-voltage terminal of the second full current-controlled battery circuit, and so on, a low-voltage terminal of the (N−1)th full current-controlled battery circuit is connected to a high-voltage terminal of the Nth full current-controlled battery circuit, a low-voltage terminal of the Nth full current-controlled battery circuit is connected to one terminal of the inductor L of the upper bridge arm, and the other one terminal of the inductor L of the upper bridge arm is one of three-phase terminals A, B, C of the external AC system.

Figure 14:
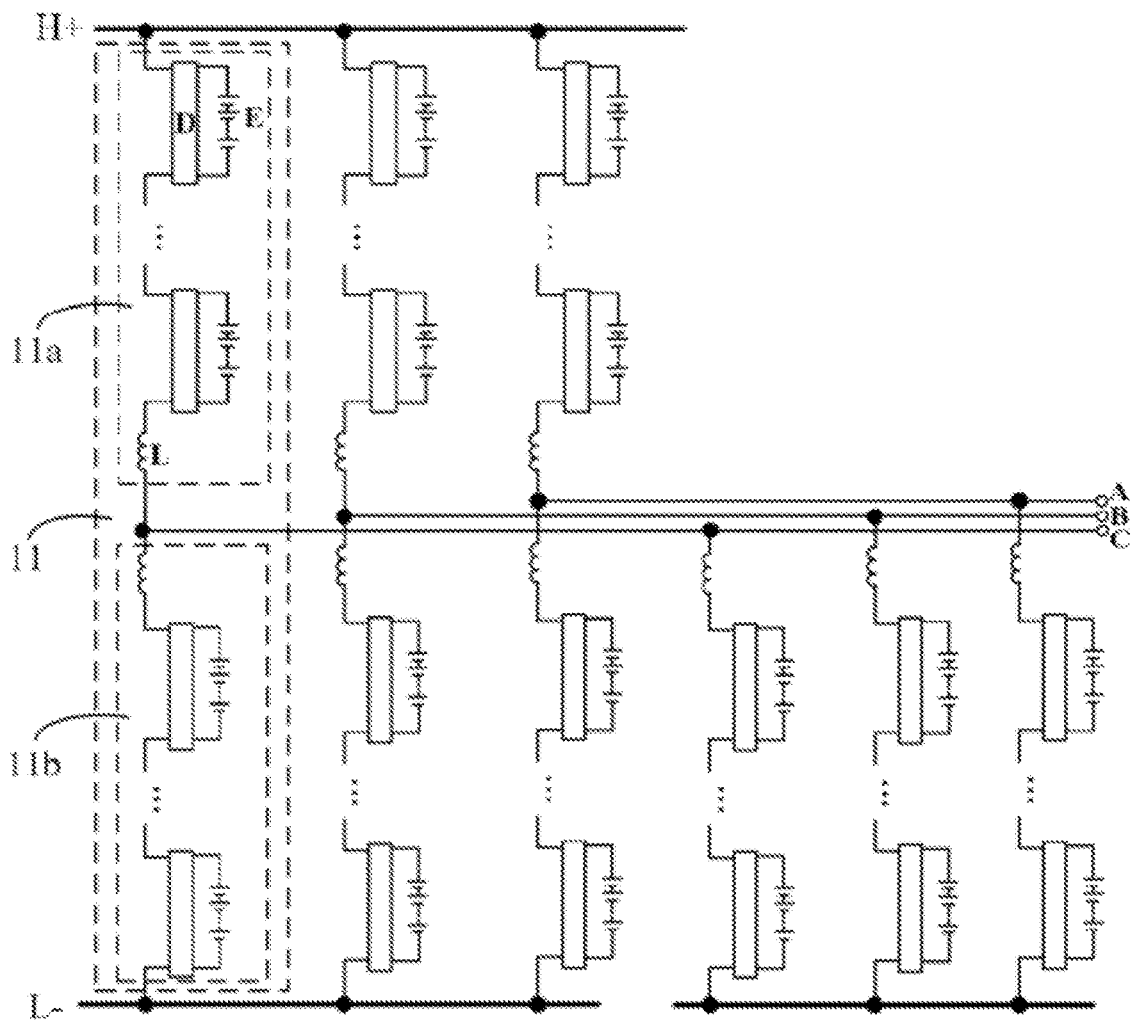
FIG. 14 illustrates a schematic topology of an AC direct grid-connected type battery energy storage system according to an eighth embodiment of the invention.

An embodiment associated with FIG. 14 is a combination of the embodiment associated with FIG. 7 and a technical roadmap of the embodiment associated with FIG. 13, specifically is a combination of a complete energy storage module 10 composed of three phase units 11 as illustrated in FIG. 7 and an energy storage module 10 composed of three lower bridge arms 11b. AC output terminals of the energy storage module composed of the three lower bridge arms 11b are connected with the AC output terminals of the energy storage module composed of the three phase units 11, and further connected with A, B, C three-phase terminals of the external AC system. An advantage of the illustrated embodiment associated with FIG. 14 is that: a minimum division unit of each energy storage system is three bridge arms, so that it is convenient to configure the number of energy storage modules of the energy storage system as required.

Figure 15:
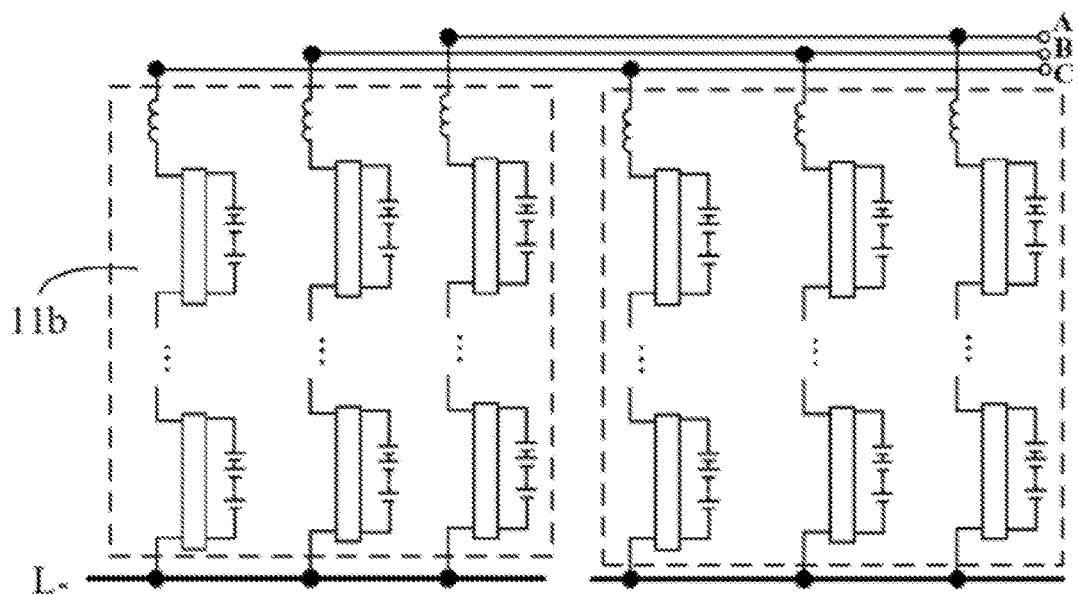
FIG. 15 illustrates a schematic topology of an AC direct grid-connected type battery energy storage system according to a ninth embodiment of the invention.

An embodiment associated with FIG. 15 is another implementation of the topology illustrated in FIG. 13. Specifically, the energy storage system is composed of two energy storage modules, and each of the two energy storage modules is composed of three lower bridge arms 11b.

FIG. 16 illustrates an implementation topology of the full current-controlled battery circuit. In particular, the full current-controlled battery circuit is composed of full-controlled power electronic devices Q1, Q2, Q9a, Q9b, Q9c, Q10a, Q10b, Q10c, an energy storage capacitor C, inductors La, Lb, Lc, and a battery module E. Each of the full-controlled power electronic devices includes a transistor and an anti-parallel diode connected with each other, and the battery module E is, for example, composed of 12 to 24 battery cells connected in series.

The full-controlled power electronic devices Q1 and Q2 are connected in series and together are connected with the energy storage capacitor C in parallel. When the Q1 is switched-on while the Q2 is switched-off, the capacitor C is conducted with the AC system and thus can suck AC current from the AC system or inject AC current into the AC system. When the Q2 is switched-on while the Q1 is switched-off, the full current-controlled battery circuit is bypassed by the Q2, and thus capacitor C neither sucks AC current from the AC system nor releases AC current to the AC system.

The Q9a, Q10a, La, Q9b, Q10b, Lb, Q9c, Q10c and Lc form three groups of energy transmission channels connecting the capacitor C with the battery module E. The Q9a, Q10a and La are taken as an example, when the battery module E needs to be charged, the Q10a is kept in a switched-off state all the time, the capacitor C charges the battery module E through the Q9a and the La by switching on the Q9a; and when the Q9a is switched off, current on the La passes through the La, the battery module E and the anti-parallel diode of Q10a to form a freewheeling loop, and the capacitor C does not charge the battery module E any more. When the battery module E needs to be discharged, the Q9a, Q10a and La are still taken as example, the Q9a is kept in a switched-off state, by switching on the Q10a, the battery module E forms a current loop through the La and the Q10a, current on the inductor La is increased, the battery module E discharges; and when the Q10a is switched-off the current on the inductor La passes through the La, the anti-parallel diode of Q9a, the capacitor C and the battery module E to form a freewheeling loop, and the inductor La and the battery module E discharge the capacitor C.

The AC direct grid-connected type battery energy storage system according to the embodiment associated with FIG. 7 employing the full current-controlled battery circuit illustrated in FIG. 16 is taken as an example, a power conversion method thereof will be described below.

Each bridge arm in FIG. 7 is composed of a plurality of full-controlled battery modules connected in series, assuming a voltage on the capacitor C is $U_c$, when the Q1 of the full-controlled battery module is switched on while the Q2 of the full-controlled battery module is switched off, the full-controlled battery module is put in operation, and an output voltage of the full-controlled battery module is $U_c$; when the Q2 of the full-controlled battery module is switched on while the Q1 of the full-controlled battery module is switched off, the full-controlled battery module is in a cut-off state, and the output voltage of the full-controlled battery module is 0. According to the control of energy storage system as illustrated in FIG. 5, the reference voltages of respective bridge arms are acquired as $V_{ref\_Ap}$, $V_{ref\_An}$, $V_{ref\_Bp}$, $V_{ref\_Bn}$, $V_{ref\_Cp}$, $V_{ref\_Cn}$; assuming a rated voltage value of the capacitor is $V_{cn}$, when the number of full-controlled battery module put in operation of each bridge arm (the upper bridge arm of A phase unit is taken as an example) is ROUND($V_{ref\_Ap}/V_{cn}$) (herein ROUND is a round-up function), the output voltage of each bridge arm can approach its reference voltage. The A phase unit is taken as an example, as per the Kirchhoff's voltage law well-known in the art, an output equivalent AC voltage of the A phase unit is ($V_{ref\_An}-V_{ref\_Ap}$)/2, and the magnitude of the output equivalent AC voltage of the A phase unit can be adjusted by adjusting magnitudes of $V_{ref\_An}$ and $V_{ref\_Ap}$, thereby controlling power exchanged between the A phase unit and the external AC system.

Those skilled in the art will readily understand that the foregoing description is merely preferred embodiments of the invention and is not intended to limit the invention, and modifications, equivalent substitutions, and improvements made within the spirit and principle of the invention shall be included within the scope of protection of the invention.

What is claimed is:

1. A power conversion method for an alternating current (AC) direct grid-connected type battery energy storage system, wherein the AC direct grid-connected type battery energy storage system comprises at least one energy storage module, and each of the at least one energy storage module comprises A, B, C three phase units each comprising an upper bridge arm and/or a lower bridge arm, each of the upper bridge arm and the lower bridge arm comprising series-connected full-controlled battery modules and an inductor connected in series;

wherein when each of the A, B, C three phase units comprises only the upper bridge arm, a low-voltage terminal of the upper bridge arm of each of the A, B, C three phase units forms an AC terminal of the phase unit, the AC terminals of the A, B, C three phase units are respectively connected to A, B, C three-phase terminals of an external AC system, and high-voltage terminals of the upper bridge arms of the A, B, C three phase units of the energy storage module are connected to form a positive direct current (DC) bus (H+) of the energy storage module;

wherein when each of the three phase units comprises only the lower bridge arm, a high-voltage terminal of the lower bridge arm of each of the A, B, C three phase units forms the AC terminal of the phase unit, the AC terminals of the A, B, C three phase units are respectively connected to the A, B, C three-phase terminals of the external AC system, and low-voltage terminals of the lower bridge arms of the A, B, C three phase units of the energy storage module are connected to form a negative DC bus (L−) of the energy storage module;

wherein when each of the A, B, C three phase units (11) comprises both the upper bridge arm and the lower bridge arm, the high-voltage terminals of the upper bridge arms of the energy storage module are connected to form the positive DC bus of the energy storage module, the low-voltage terminals of the lower bridge arms of the energy storage module are connected to form the negative DC bus of the energy storage module, the low-voltage terminal of the upper bridge arm and the high-voltage terminal of the lower bridge arm of each of the A, B, C three phase units are connected to form the AC terminal of the phase unit, and the AC terminals of the A, B, C three phase units are respectively connected to the A, B, C three-phase terminals of the external AC system;

wherein each of the full-controlled battery modules comprises a full current-controlled battery circuit and a battery module, the full current-controlled battery circuit comprises an energy transmission control unit and an intermediate energy unit, the intermediate energy unit comprises an energy storage capacitor, the energy storage capacitor is connected with the battery module in parallel, and the energy transmission control unit comprises first full-controlled power electronic devices configured to realize conduction or non-conduction of the energy storage capacitor with the external AC system;

wherein the power conversion method comprises:

step (1), acquiring voltages and currents on the A, B, C three-phase terminals of the external AC system, calculating an active power measured value $P_{acpu}$ and a reactive power measured value $Q_{acpu}$ of the AC direct grid-connected type battery energy storage system according to the voltages and the currents on the A, B, C three-phase terminals of the external AC system, and calculating an AC active current reference value $I_{dref}$ and an AC reactive current reference value $I_{qref}$ according to the active power measured value $P_{acpu}$, the reactive power measured value $Q_{acpu}$, an active power reference value $P_{acref}$ and a reactive power reference value $Q_{ref}$;

step (2), performing closed-loop tracking control on the AC active current reference value $I_{dref}$ and the AC reactive current reference value $I_{qref}$ to obtain AC modulation ratios $m_a$, $m_b$, $m_c$, and calculating reference voltages of the upper bridge arms and/or the lower bridge arms of the A, B, C three phase units according to the AC modulation ratios $m_a$, $m_b$, $m_c$ as per formulas as follows:

$$V_{ref\_Ap} = V_{dcn}/2 - m_a \times V_{dcn}/2,$$

$$V_{ref\_An} = V_{dcn}/2 + m_a \times V_{dcn}/2,$$

$$V_{ref\_Bp} = V_{dcn}/2 - m_b \times V_{dcn}/2,$$

$$V_{ref\_Bn} = V_{dcn}/2 + m_b \times V_{dcn}/2,$$

$$V_{ref\_Cp} = V_{dcn}/2 - m_c \times V_{dcn}/2,$$

$$V_{ref\_Cn} = V_{dcn}/2 + m_c \times V_{dcn}/2,$$

where, $V_{ref\_Ap}$ represents the reference voltage of the upper bridge arm of the A phase unit, $V_{ref\_An}$ represents the reference voltage of the lower bridge arm of the A phase unit, $V_{ref\_Bp}$ represents the reference voltage of the upper bridge arm of the B phase unit, $V_{ref\_Bn}$ represents the reference voltage of the lower bridge arm of the B phase unit, $V_{ref\_Cp}$ represents the reference voltage of the upper bridge arm of the C phase unit, $V_{ref\_Cn}$ represents the reference voltage of the lower bridge arm of the C phase unit, and $V_{dcn}$ represents a DC rated voltage of the positive DC bus to the negative DC bus; and step (3), calculating numbers of full current-controlled battery circuit required to be put in operation of the upper bridge arms and/or the lower bridge arms of the A, B, C three phase units according to the reference voltages of the upper bridge arms and/or the lower bridge arms of the A, B, C three phase units, and controlling the first full-controlled power electronic devices of the full current-controlled battery circuits of the upper bridge arms and/or the lower bridge arms of the A, B, C three phase units correspondingly according to the numbers of full current-controlled battery circuit required to be put in operation of the upper bridge arms and/or the lower bridge arms of the A, B, C three phase units to make differences of output voltages of the upper bridge arms and/or the lower bridge arms of the A, B, C three phase units with respect to the respective reference voltages of the upper bridge arms and/or the lower bridge arms of the A, B, C three phase units be within a set range, thereby realizing power conversion between the AC direct grid-connected type battery energy storage system and the external AC system.

2. The power conversion method for the AC direct grid-connected type battery energy storage system as claimed in claim 1, wherein in the step (3), formulas of calculating numbers of full current-controlled battery circuit required to be put in operation of the upper bridge arms and/or the lower bridge arms of the A, B, C three phase units are as follows:

$$N_{Ap} = \text{ROUND}(V_{ref\_Ap}/V_{cn}),$$

$$N_{An} = \text{ROUND}(V_{ref\_An}/V_{cn}),$$

$$N_{Bp} = \text{ROUND}(V_{ref\_Bp}/V_{cn}),$$

$$N_{Bn} = \text{ROUND}(V_{ref\_Bn}/V_{cn}),$$

$$N_{Cp} = \text{ROUND}(V_{ref\_Cp}/V_{cn}),$$

$$N_{Cn} = \text{ROUND}(V_{ref\_Cp}/V_{cn}),$$

where, $N_{Ap}$ represents the number of full current-controlled battery circuit required to be put in operation of the upper bridge arm of the A phase unit, $N_{An}$ represents the number of full current-controlled battery circuit required to be put in operation of the lower bridge arm of the A phase unit, $N_{Bp}$ represents the number of full current-controlled battery circuit required to be put in operation of the upper bridge arm of the B phase unit, $N_{Bn}$ represents the number of full current-controlled battery circuit required to be put in operation of the lower bridge arm of the B phase unit, $N_{Cp}$ represents the number of full current-controlled battery circuit required to be put in operation of the upper bridge arm of the C phase unit, $N_{Cn}$ represents the number of full current-controlled battery circuit required to be put in operation of the lower bridge arm of the C phase unit, ROUND represents a round-up function, and $V_{cn}$ represents a rated voltage of the energy storage capacitor.

3. The power conversion method for the AC direct grid-connected type battery energy storage system as claimed in claim 1, wherein in the step (1), the calculating an AC active current reference value $I_{dref}$ and an AC reactive current reference value $I_{qref}$ specifically comprises:

comparing the active power measured value $P_{acpu}$ with the active power reference value $P_{acref}$ by a difference operation and then performing a proportional-integral adjustment to obtain the AC active current reference value $I_{dref}$; and comparing the reactive power measured value $Q_{acpu}$ with the reactive power reference value $Q_{ref}$ and then performing a proportional-integral adjustment to obtain the AC reactive current reference value $I_{qref}$.

4. The power conversion method for the AC direct grid-connected type battery energy storage system as claimed in claim 1, wherein the full current-controlled battery circuit further comprises a current control unit, the current control unit comprises a three-phase full-bridge circuit comprising six second full-controlled power electronic devices, two input terminals of the three-phase full-bridge circuit of the full current-controlled battery circuit are correspondingly connected to two terminals of the energy storage capacitor of the full current-controlled battery circuit, and AC output terminals of the three-phase full-bridge circuit of the full current-controlled battery circuit are connected to the battery module through inductors, respectively;

wherein the power conversion method further comprises:

acquiring voltages on the energy storage capacitors and currents $I_{dis}$ of the inductors of the all full current-controlled battery circuits of the upper bridge arms and/or the lower bridge arms of the A, B, C three phase units;

averaging the voltages on the energy storage capacitors of the all full current-controlled battery circuits of the upper bridge arms and/or the lower bridge arms of the A, B, C three phase units and then comparing with an average capacitor voltage reference value $V_{Cref}$ of the energy storage capacitors of the all full current-controlled battery circuits by a difference operation to obtain a difference value, and performing a proportional-integral adjustment on the difference value to obtain discharge current orders $I_{ord}$ of the battery modules corresponding to the all full current-controlled battery circuits;

comparing the discharge current orders $I_{ord}$ of the battery modules respectively with the currents $I_{dis}$ of the inductors of the all full current-controlled battery circuits corresponding to the battery modules by difference operations and then performing closed-loop control through a proportional-integral controller or a current hysteresis loop controller to obtain duty cycle signals for the six second full-controlled power electronic devices of each of the all full current-controlled battery circuits, and controlling ON-OFF states of the six second full-controlled power electronic devices of each of the all full current-controlled battery circuits by the duty cycle signals to perform closed-loop control on the currents $I_{dis}$ of the inductors of the all full current-controlled battery circuits and thereby ensure a balance between an active power output from the AC direct grid-connected type battery energy storage system to the external AC system and a discharge power of full current-controlled battery circuit.

5. The power conversion method for the AC direct grid-connected type battery energy storage system as claimed in claim 1, wherein the AC terminals of the A, B, C three phase units of the energy storage module are respectively connected to the A, B, C three-phase terminals of the external AC system through an AC transformer.

6. The power conversion method for the AC direct grid-connected type battery energy storage system as claimed in claim 1, wherein each of the A, B, C three phase units is composed of three bridge arms, and a combination form of the three bridge arms is a combination of three the upper bridge arm or a combination of three the lower bridge arm.

7. The power conversion method for the AC direct grid-connected type battery energy storage system as claimed in claim 1, wherein the AC direct grid-connected type battery energy storage system further comprises a redundant phase unit, an AC terminal of the redundant phase unit is connected to first terminals of three single-phase AC circuit breakers, second terminals of the three single-phase AC circuit breakers are respectively connected to the A, B, C three-phase terminals of the external AC system, and the AC terminals of the A, B, C three phase units of the energy storage module are respectively connected to the A, B, C three-phase terminals of the external AC system through an AC circuit breaker.

8. The power conversion method for the AC direct grid-connected type battery energy storage system as claimed in claim 4, wherein each of the first full-controlled power electronic devices and the second full-controlled power electronic devices comprises one or more transistors and an anti-parallel diode connected thereto, and the battery module comprises 12~24 battery cells connected in series.

9. The power conversion method for the AC direct grid-connected type battery energy storage system as claimed in claim 1, wherein the first full-controlled power electronic devices of the energy transmission control unit of the full current-controlled battery circuit are two first full-controlled power electronic devices respectively being a full-controlled power electronic device Q1 and a full-controlled power electronic device Q2, a low-voltage terminal of the full-controlled power electronic device Q1 is connected with a high-voltage terminal of the full-controlled power electronic device Q2, a high-voltage terminal of the full-controlled power electronic device Q1 is connected to a terminal of the energy storage capacitor, and a low-voltage terminal of the full-controlled power electronic device Q2 is connected to another terminal of the energy storage capacitor.

\* \* \* \* \*